US009283624B2

(12) United States Patent
Freyermuth et al.

(10) Patent No.: US 9,283,624 B2
(45) Date of Patent: Mar. 15, 2016

(54) BORING TOOL ON A FLANGE

(75) Inventors: Alain Freyermuth, Pfaffenhoffen (FR); Michel Schmitt, Balbronn (FR); Claude Jaeger, Monswiller (FR); Fabrice Ochs, Monswiller (FR)

(73) Assignee: SECO-E.P.B., Bouxwiller (FR)

( * ) Notice: Subject to any disclaimer, the term of this patent is extended or adjusted under 35 U.S.C. 154(b) by 506 days.

(21) Appl. No.: 13/701,974

(22) PCT Filed: Jun. 7, 2011

(86) PCT No.: PCT/FR2011/051280
§ 371 (c)(1),
(2), (4) Date: Jul. 26, 2013

(87) PCT Pub. No.: WO2011/154649
PCT Pub. Date: Dec. 15, 2011

(65) Prior Publication Data
US 2013/0294855 A1    Nov. 7, 2013

(30) Foreign Application Priority Data

Jun. 7, 2010  (FR) ..................................... 10 54461

(51) Int. Cl.
*B23B 29/034* (2006.01)
*B23Q 1/28* (2006.01)
*B23Q 11/10* (2006.01)

(52) U.S. Cl.
CPC ........... *B23B 29/034* (2013.01); *B23B 29/0341* (2013.01); *B23Q 1/282* (2013.01);
(Continued)

(58) Field of Classification Search
CPC ..................... Y10T 408/8598; Y10T 408/858; B23B 29/034; B23B 29/03407; B23B 29/0341; B23B 29/03414; B23B 29/03425; B23B 29/03435; B23B 29/03467; B23B 29/03489
See application file for complete search history.

(56) References Cited

U.S. PATENT DOCUMENTS 1,251,139 A * 12/1917  Van Der Vorn ............... 408/183
1,251,140 A * 12/1917  Van Der Vorn ............... 408/182
(Continued)

FOREIGN PATENT DOCUMENTS

DE       11 03 112 A1    3/1961
DE       10216538 A1 *   7/2003   .......... B23B 29/0341
(Continued)

OTHER PUBLICATIONS

International Search Report for corresponding application No. PCT/FR2011/051280 mailed Sep. 6, 2011.
(Continued)

*Primary Examiner* — Sunil K Singh
*Assistant Examiner* — Ryan Rufo
(74) *Attorney, Agent, or Firm* — Carter, DeLuca, Farrell & Schmidt, LLP

(57) ABSTRACT

A boring tool on a flange consisting of at least one tool holder and a flange, in which the tool holder is fitted with a means of gripping designed to engage the guiding and clamping assembly of the slide for guiding and holding the fastening flange, which is provided, in addition, with a device for limiting the travel of the tool holder or of the counterweight, or the positioning lug of a tool holder or of a counterweight can be put aside during placement a tool holder or a counterweight and returns automatically into position after this placement and in which each tool holder is fitted with a device for lubricating the cutting edge of the tool, coupled to the means of centralized lubrication of the flange. The tool is more particularly applicable in the field of numerically-controlled machine-tool accessories, tooling centers, cubicles, and flexible workshops.

13 Claims, 6 Drawing Sheets

(52) U.S. Cl.
CPC ........... *B23Q 11/10* (2013.01); *B23Q 11/1023* (2013.01); *B23B 2250/04* (2013.01); *B23B 2250/12* (2013.01); *Y10T 408/26* (2015.01)

(56) References Cited

U.S. PATENT DOCUMENTS

| | | | | |
|---|---|---|---|---|
| 1,635,103 | A | * | 7/1927 | Welsby .......... 408/154 |
| 1,824,543 | A | * | 9/1931 | Hartwell .......... 408/183 |
| 3,067,637 | A | * | 12/1962 | Horning .......... 82/1.2 |
| 3,207,015 | A | * | 9/1965 | Ditto .......... 82/158 |
| 4,040,315 | A | * | 8/1977 | Bellingham .......... 82/131 |
| 4,547,103 | A | | 10/1985 | Pape et al. |
| 5,909,986 | A | * | 6/1999 | Kaiser et al. .......... 408/181 |
| 6,840,719 | B2 | * | 1/2005 | Tugend et al. .......... 408/181 |
| 2009/0279963 | A1 | * | 11/2009 | D'Andrea .......... 407/45 |
| 2012/0058871 | A1 | * | 3/2012 | Nakamura et al. .......... 483/13 |
| 2012/0269590 | A1 | * | 10/2012 | Buck .......... 408/16 |

FOREIGN PATENT DOCUMENTS

| | | | |
|---|---|---|---|
| EP | 0390697 A1 | * 10/1990 | ........ B23B 29/03439 |
| EP | 0 804 984 A1 | 11/1997 | |
| FR | 2 117 330 A5 | 7/1972 | |
| FR | 2 194 508 A1 | 3/1974 | |
| FR | 2 563 132 A1 | 10/1985 | |

OTHER PUBLICATIONS

Seco Tools: "Catalog:MN 2008 Holemaking", Dec. 2008, XP002617146, pp. 324-337.

* cited by examiner

BORING TOOL ON A FLANGE

The present invention concerns the field of numerically-controlled machine tools, tooling centers, cubicles, and flexible workshops and has as its object a boring tool on a flange to achieve precise, large-diameter holes in monolithic pieces with large dimensions which exhibit very stringent geometric characteristics, using interchangeable boring tools.

Devices are currently known which allow for adjusting the diameter selected, but in which a mass disequilibrium must obligatorily appear which leads to an imbalance during the boring operation, this imbalance being more noticeable as rotation rates increase. Thus, modern machines and the new materials used generally allow for elevated cutting speeds.

For this purpose, the known boring heads of this type are generally fitted with two tools or with a tool and a counterweight mounted in a diametrically opposed manner on a feed flange, with the option of adjusting the position of the latter by running on a corresponding slide, then being held on this slide by clamping.

Precision during the adjustment is therefore very important for this type of tool holder, and it is equally indispensable for avoiding any variation during final clamping. In addition, it is necessary to ensure the tool holder(s) is/are held on the flange, in order to take into account continued increase in rotation rates related to evolving technological progress, which leads to a corresponding increase in centrifugal forces acting on the tool holders and, as a corollary, a risk of a corresponding release of the tool holder(s) from the flange, for example, due to inadequate clamping.

However, the small cutting flanges implemented in the tools fitted to these tool holders are generally lubricated by the intermediary of lubrication devices, commonly called lubrication columns, which are disposed some distance from the cutting zone. Thus, due to the increase in cutting speed, the jet of cutting oil swerves from the cutting zone such that it loses its effectiveness entirely.

The goal of the present invention is to compensate for these drawbacks in proposing a boring tool on a flange which allows for connecting the flange to the tool holder(s) and/or to a counterweight in advance, while still permitting position adjustment of the tool holder(s) or counterweight before they are finally clamped onto the flange, as well as permitting effective lubrication of the cutting edge(s).

For this purpose, a boring tool on a flange according to the invention, which is made up essentially of at least one tool holder and a fastening flange on a machine broach, fitted, on the one hand, with a slide for guiding and holding at least one tool holder perpendicular to the axis of said broach by the intermediary of a guiding and clamping assembly and, on the other hand, with at least one positioning lug of a tool holder or of a counterweight, the flange including, in addition, a means of centralized lubrication for the cutting edge(s) of the tool holder(s) mounted on the said flange, is characterized in that the tool holder is fitted with means of gripping designed to engage the guiding and clamping assembly of the slide for guiding and holding the fastening flange, which is provided, in addition, with a device for limiting the travel of the tool holder or of the counterweight, in which the positioning lug of a tool holder or of a counterweight can be put aside during placement of a tool holder or a counterweight and returns automatically into position after this placement and in which each tool holder is fitted with a lubricating device for the cutting edge of the tool coupled to the means of centralized lubrication of the flange.

The invention will be better understood, thanks to the description hereinafter, which pertains to a preferred embodiment, given by way of a non-limiting example and explained with reference to the schematic drawings attached, in which.

Figure 1:
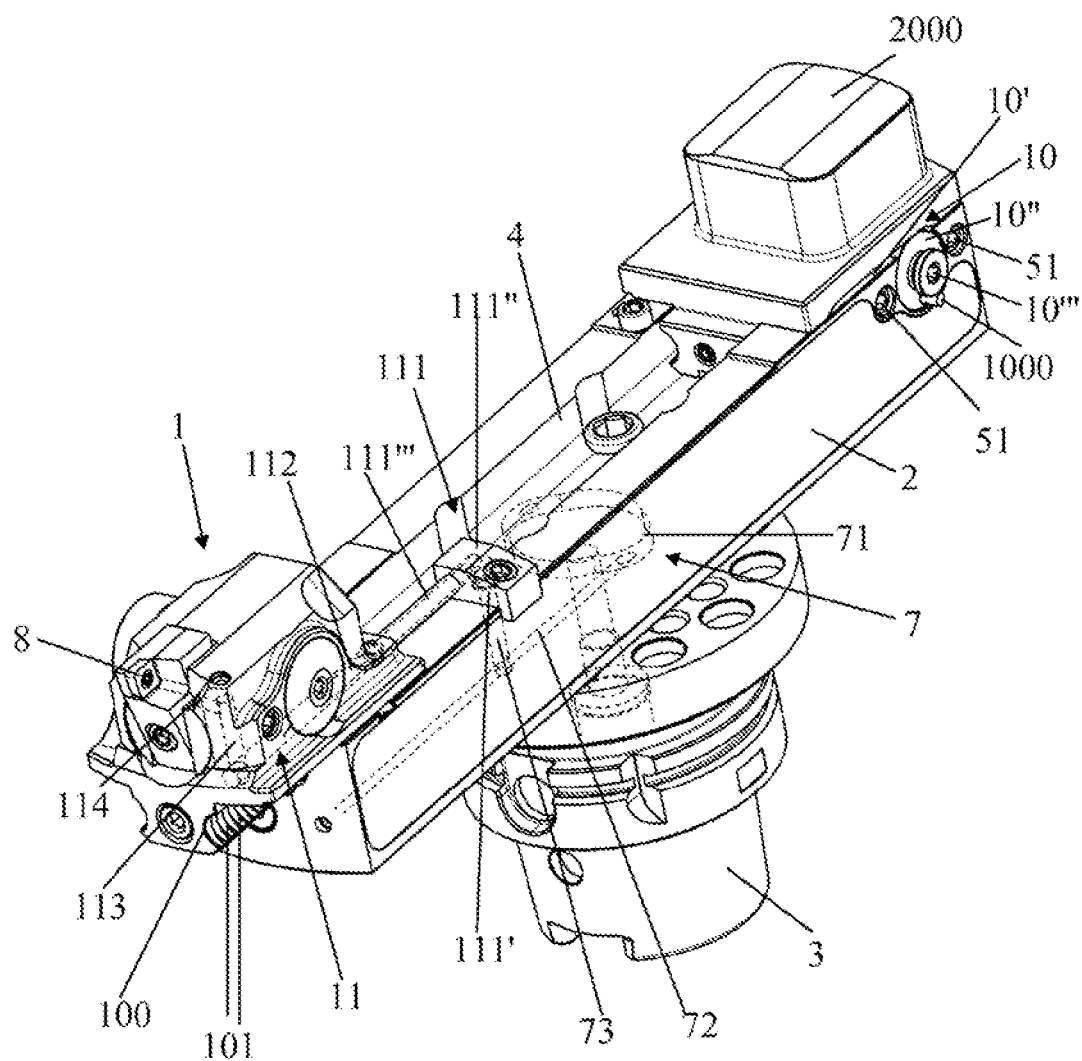
FIG. 1 is a perspective view of a boring tool on a flange according to the invention.

FIG. 1 of the appended drawings depicts, by way of example, a boring tool on a flange, which is essentially made up of at least one tool holder 1 and a fastening flange 2 on a machine broach 3. This flange 2 is fitted on the one hand with a slide 4 for guiding and holding at least one tool holder 1, perpendicular to the axis of the said broach 3 by the intermediary of a guiding and clamping assembly 5 and, on the other hand, at least one positioning lug 6 of a tool holder 1 or of a counterweight 2000. The flange 2 includes, in addition, a means 7 of centralized lubrication for the cutting edge(s) 8 of the tool holder(s) 1 mounted on said flange 2.

Figure 2:
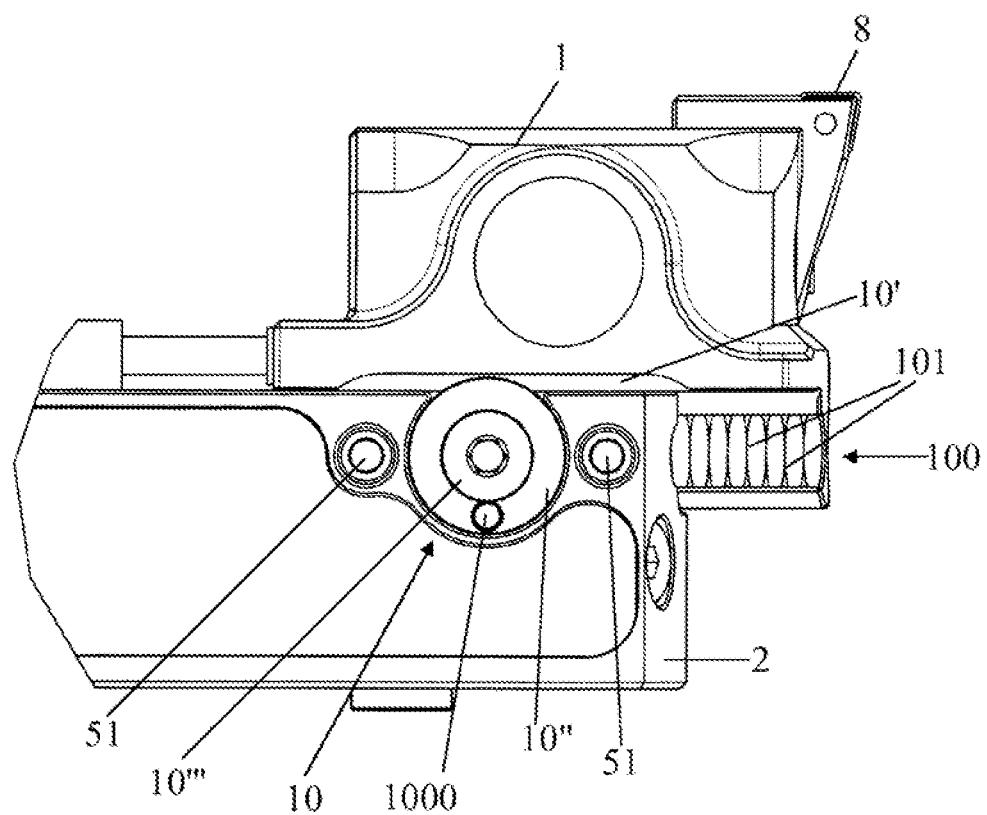
FIG. 2 is a partial side elevation view representing the device for limiting the travel of the tool holder.
Figure 6:
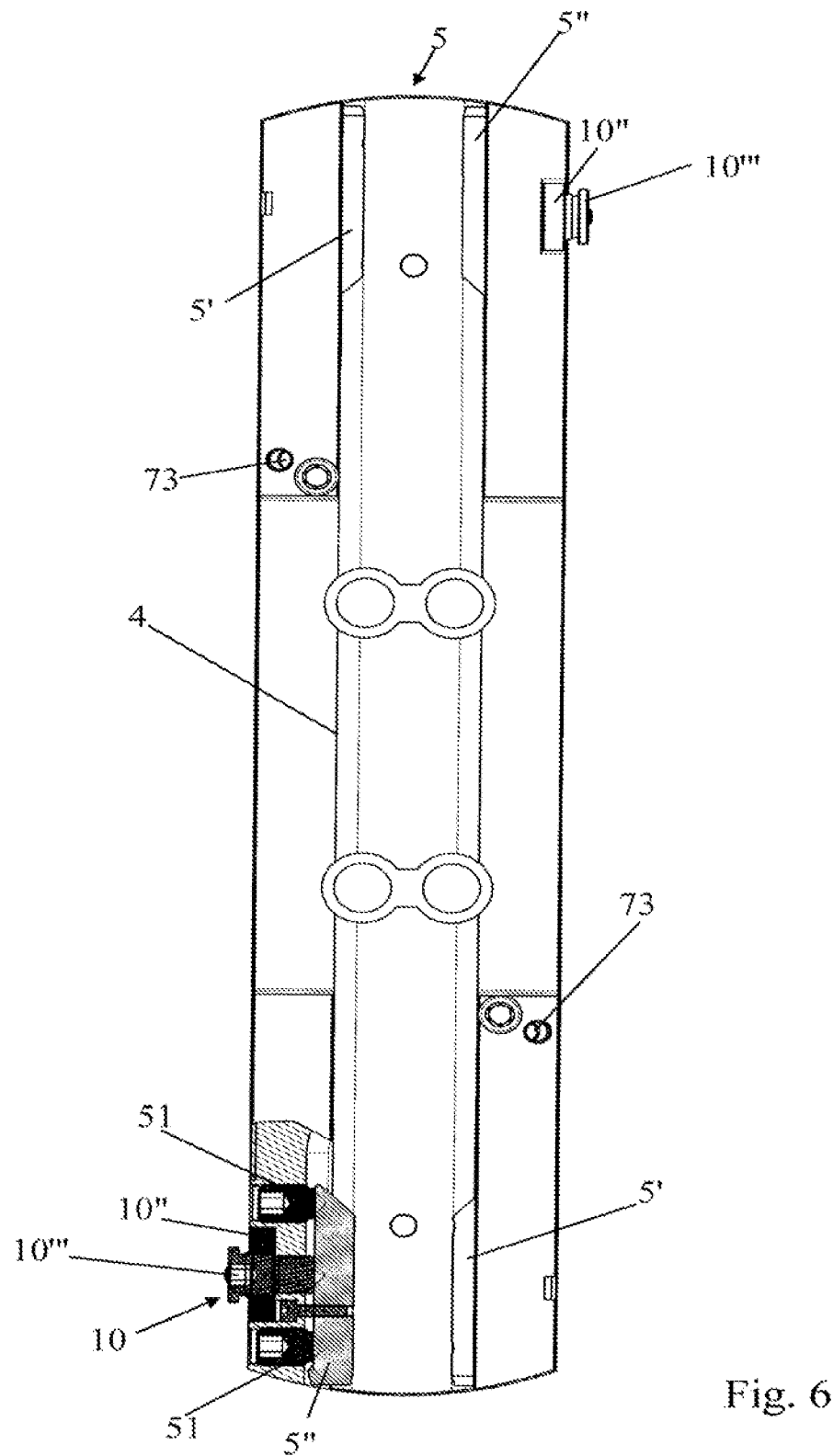
FIG. 6 is a plan view and a partial section of the flange at the guiding and clamping assembly of the slide for guiding and holding the fastening flange.
Figure 7:
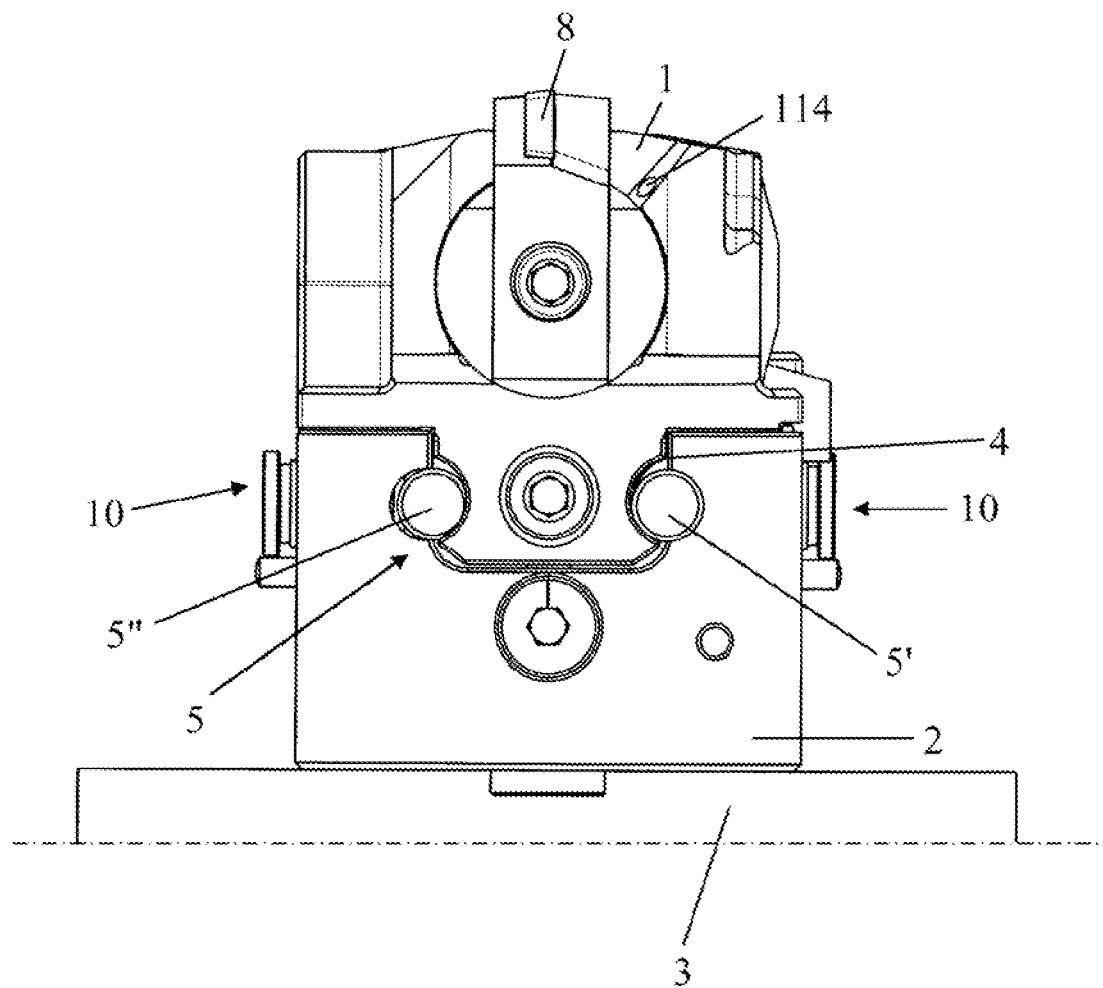
FIG. 7 is a partial front elevation view of the set-up of the tool holder on the flange.

The guiding and clamping assembly 5 of the slide 4 for guiding and holding at least one tool holder 1 and a counterweight 2000 is made up of a fixed gauge 5' clamped in a longitudinal slot corresponding to a side wall of the slide 4 and by a movable gauge 5" mounted, in a manner displaceable by the intermediary of a screw 51, at a slot opposite that receiving the fixed gauge 5' (FIGS. 1, 2, and 6). Thus, tightening the screws 51 achieves a displacement of the movable gauge 5" in the direction of the fixed gauge 5'. The tool holder 1 is provided in a known manner with guiding means 100 designed to engage the fixed 5' and movable 5" gauges to displace said tool holder 1 in the flange 2 and to clamp it in position.

By tightening the screws 51, the movable gauge 5" achieves a pressure on the corresponding guiding means 100 of the tool holder 1 and thus clamps the latter on the slide 4 by tightening together with the fixed gauge 5'. In this way, guidance and a translational link are achieved similar to those of a dovetail guiding device, a radial hold resistant to centrifugal force being obtained by clamping the means 100 of said tool holder 1 on the slide 4 including the gauges 5' and 5" of the flange 2. The set-up of the movable gauge 5" is of a known type and consists simply of fastening said gauge to the inside of the slide 4 by means of the intermediary of screws sunk into said gauge 5", which is mounted on said screws against spring action which tends to operate against the corresponding inside wall of slide 4.

Figure 5:
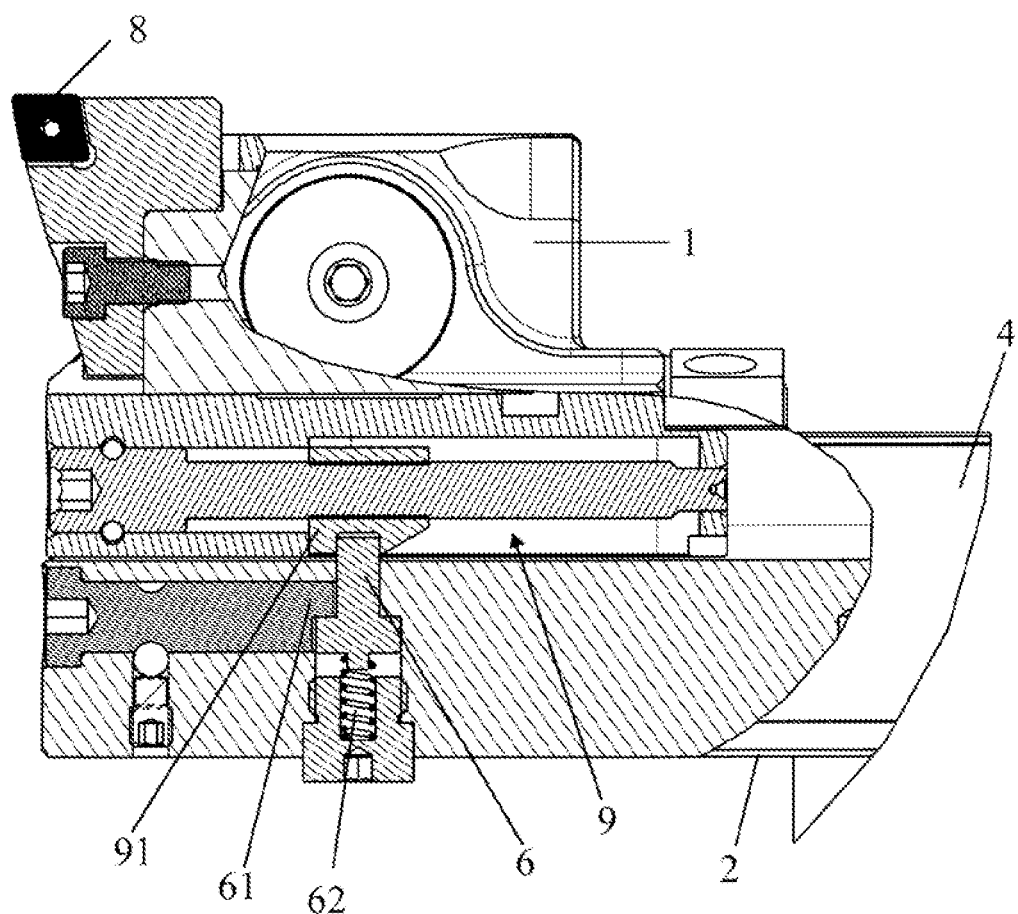
FIG. 5 is a partial sectional view on a larger scale, depicting the lug which can be put aside in relation to the position-adjustment device of the tool holder.

However, the positioning lug 6 of a tool holder 1 or of a counterweight 2000 is located in the base of slide 4 of flange 2 and can be maneuvered by the intermediary of a rotational axis 60 fitted with a displacement cam 61 of this lug 6 (FIG. 5). This lug 6 is designed to engage a fine-adjustment device 9 for the tool holder 1, located in the base of this tool holder 1 at the corresponding guiding means 100 of the tool holder 1 and in particular with a nut 91 of the latter.

Finally, the means 7 of centralized lubrication for cutting edge(s) 8 of tool holder(s) 1 located in flange 2 is made up of a central drillhole 71 as a lubricant inlet coupled to tangential conduits 72 extending into flange 2 parallel to its longitudinal edges and emerging in perpendicular conduits 73 (FIGS. 1 and 6).

Since a boring tool on a flange is generally fitted with only a single tool holder 1 and one counterweight 2000, the description that follows will always refer to only one tool holder 1.

However, it will appear clearly on the drawings that flange 2 is perfectly symmetrical in 180° rotation about the central drillhole axis 71 of the means 7 of centralized lubrication. The devices described in relation to the tool holders are therefore perfectly identical to that mounted on either the right or the left according to the disposition of FIG. 1.

Figure 3:
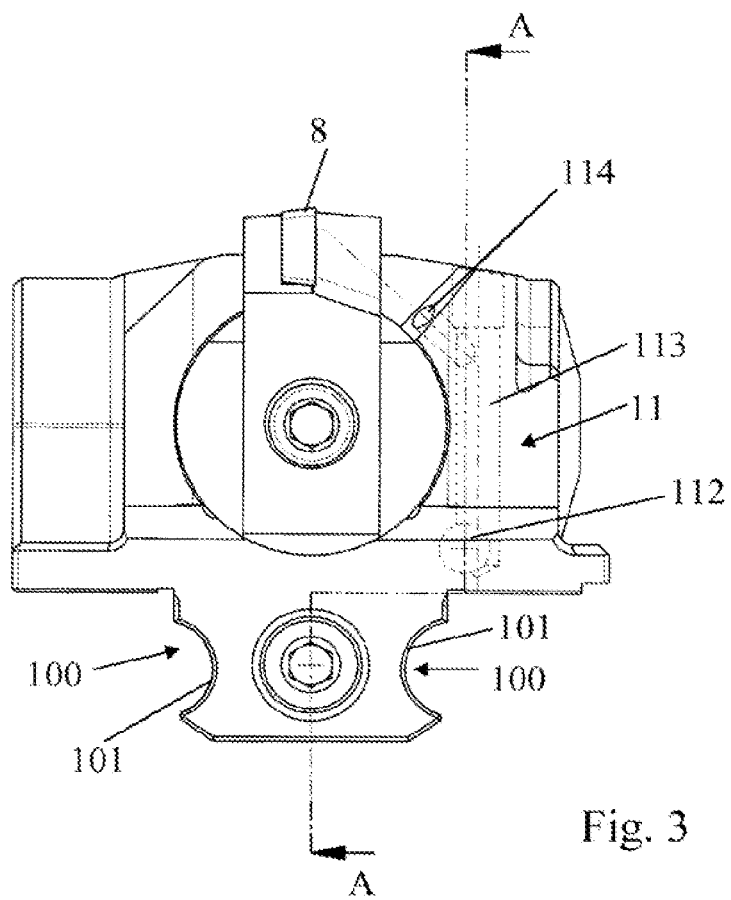
FIG. 3 is a front elevation view, on a larger scale than the tool holder.
Figure 4:
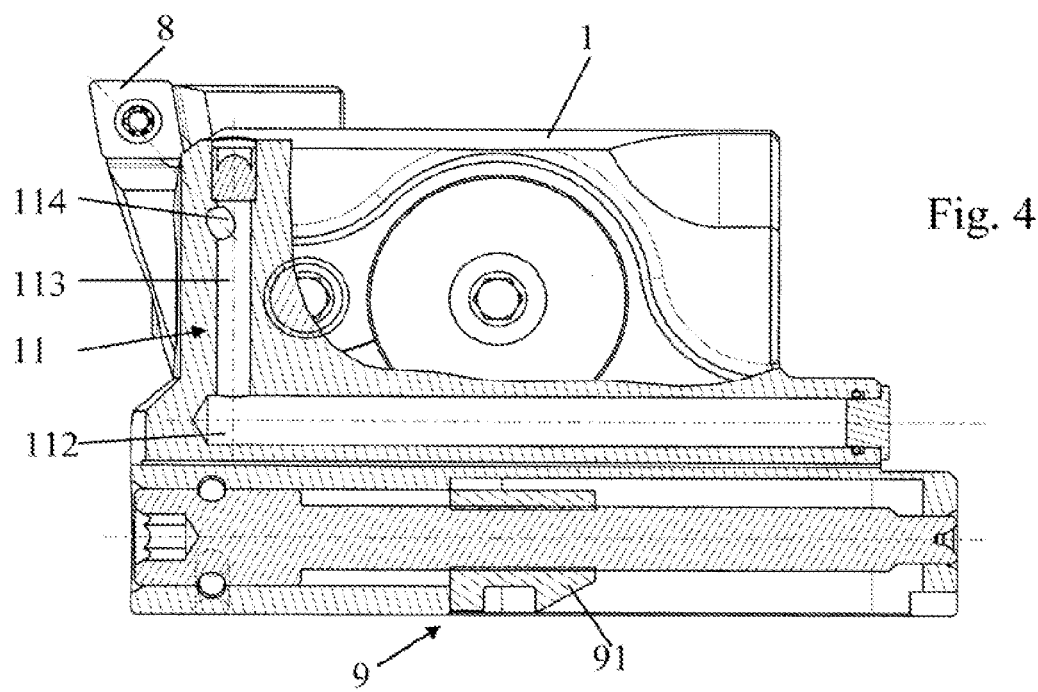
FIG. 4 is a side elevation view and a section along A-A in FIG. 3.

According to the invention, tool holder 1 is fitted with gripping means 101 designed to work together with the guiding and clamping assembly 5 of the slide 4 for guiding and holding fastening flange 2, which is provided, in addition, with a device 10 for limiting the travel of tool holder 1 or of the counterweight 2000 (FIGS. 1 to 3). In addition, positioning lug 6 of tool holder 1 or of counterweight 2000 can be put aside during placement of a tool holder 1 or counterweight 2000, and it returns automatically into position after this placement, and each tool holder 1 is fitted with a device 11 for lubricating the cutting edge 8 of the tool, coupled to a means 7 of centralized lubrication of flange 2 (FIG. 5).

The gripping means 101 of the tool holder consist advantageously of corrugations or similar projections relative to the general form of the guiding means 100 provided on the tool holder 1 (FIGS. 1 to 3). Preferably, the constituent material of the guiding means 100 of the tool holder 1, and therefore the corrugations forming the gripping means 101, is a material exhibiting a hardness greater than that of the constituent material of the fixed 5' and movable 5" gauges forming the guiding and clamping assembly 5 of the slide 4.

This results in the contact surface between the guiding means 100 and the assembly 5 being decreased and reduced to a plurality of linear contacts, so that, due to the greater hardness of the gripping means 101, the corrugations forming these means bring about a corresponding elastic deformation of the surface of gauges 5' and 5", allowing gripping that improves in a very significant manner the sliding resistance relative to a smooth contact. In fact, this resistance to sliding can be improved by almost 50%. This results in the clamping of the tool holder 1 onto flange 2 being very clearly improved, which contributes to improved holding of tool holder 1, as well as of the counterweight 2000, on flange 2 and therefore to an elevated resistance to centrifugal forces generated by very high rates of rotation.

The device 10 for limiting the travel of tool holder 1 or of the counterweight 2000 (FIGS. 1, 2, and 6) consists, on the one hand, of a side groove 10' provided on a side shoulder of tool holder 1 leaning against one edge of flange 2 demarcating slide 4 and, on the other hand, of a washer 10" or a small flange fastened in a slot on the corresponding side of flange 2 and exhibiting a part projecting relative to the corresponding support side of tool holder 1, this projecting part engaging side groove 10'. Thus, after inserting the tool holder 1 into flange 2, it is possible to limit the travel of tool holder 1 on flange 2 and to avoid any risk of involuntary extraction of the said tool holder 1, in particular ejection, by placing the washer 10" at the corresponding slot provided on flange 2 and inserting its upper part into the side groove 10' of said tool holder 1.

The washer 10" or small flange is fastened onto flange 2 by the intermediary of a screw 10'''.

Preferably, washer 10" or small flange is mounted on a stagger screw 10''' exhibiting two reverse or variable-pitch threads and is kept from rotating by the intermediary of a cotter pin 1000. In addition, screw 10''' acts advantageously on the movable gauge 5" by means of its end. Thus, when clamping the movable gauge 5" with a view to clamping tool holder 1, washer 10' or small flange is fed toward the base of its slot in flange 2 and its projecting part on the support face of said flange 2 penetrates into the groove 10' of said tool holder 1. Washer 10" is mounted on a reverse-threaded or variable-pitch-threaded screw 10''' with the provision of an initial offset between the base of the corresponding slot of flange 2 and the corresponding wall of washer 10" or of the small flange in such a way that screwing screw 10''' into flange 2 is done while washer 10" or the small flange is held by the cotter pin 1000 to keep it from rotating.

The result of this is that when screwing, which leads to displacement of the head of the screw in the direction of the flange, washer 10" or the small flange has a tendency to move away from the corresponding face of the screw head, so that when unscrewing, washer 10" or small flange leaves the slot and thus frees up the path of tool holder 1 completely. In the case of using screw 10''' to clamp the movable gauge 5", the offsets described above must be provided in such a way that the final clamping of gauge 5" is done before the application of washer 10" or the small flange at the base of its slot. In addition, this set-up for washer 10" or small flange renders the latter unable to be removed and therefore captive.

The positioning lug 6 of a tool holder 1 or of a counterweight 2000 is mounted in the base of slide 4 of flange 2 with the possibility of displacement against the action of a backing spring 62 acting on the displacement cam 61 of this lug 6. Thus, lug 6 remains continually projecting onto the base of slide 4 to engage nut 91 of the fine-adjustment device 9 of tool holder 1 (FIG. 5). This results, during the insertion of the tool holder 1 into flange 2, in it being sufficient to clinch the said device 9 onto lug 6 to accomplish the positioning in advance and immediate holding of tool holder 1 on flange 2, so that the mounting of tool holder 1 on flange 2 is immediately secured, even if the final clamping has not been done yet. The fine-adjustment device 9 for tool holder 1 is advantageously provided in a known manner in order to clinch it, with an inclined surface favoring lug 6 being put aside for its clinching.

To remove the tool holder 1, it is sufficient, of course, as with known lugs, to maneuver lug 6 in the direction of putting it aside to release device 9 and thus tool holder 1. Of course, this release of tool holder 1 can only be done after suppressing travel limitation, that is, after extracting washer 10" or the small flange from groove 10' of tool holder 1. Thus, an accidental ejection of tool holder 1 can be avoided entirely, tool holder 1 being held continuously against such an ejection, from the moment of its placement on flange 2.

The fine-adjustment device 9 for tool holder 1, located at the base of this tool holder 1 at the corresponding guiding means 100 of tool holder 1, is of a known type per se and does not necessitate particular description, not being in itself the object of the present invention.

The device 11 for lubricating cutting edge 8 of the tool, coupled to the means 7 of centralized lubrication for flange 2 consists essentially, on the one hand, of a connection device 111 coupled on the one hand, to a perpendicular conduit 73 of the means 7 of centralized lubrication for flange 2 (FIG. 1) and, on the other hand, to a longitudinal conduit 112 provided in the body of tool holder 101 and extended vertically, from the side opposite the connection device 111 by means of a vertical conduit 113 emerging into a coolant duct 114 for cutting edge 8.

The connection device 111 consists advantageously of a first conduit 111' communicating with or inserted into conduit 73 of the means 7 of centralized lubricating with the interposition of an O-ring or similar, this conduit 111' emerging into a body 111" extended by means of a second conduit 111''' penetrating into longitudinal conduit 112 provided in the body of tool holder 101, the seal at this last connection being likewise executed by an O-ring or similar. Thus, it is possible to cause a liquid lubricant under high pressure to be discharged from the center of the tool holder directly onto cutting edge 8. In addition, due to the tight seal between device 111 and conduits 73 and 112 by the intermediary of conduits 111' and 111" engaging the O-rings, it is possible to proceed to adjust the tool holder by means of the necessary displacements, while still guaranteeing perfect sealing.

Preferably, the coolant duct 114 for cutting edge 8 is a flat-jet duct or nozzle. This duct can advantageously be executed in the form of an Allen screw provided with a slit with a lengthened end, this Allen screw being stuck after position adjustment in a corresponding slot provided at the end of vertical conduit 113 of tool holder 1.

Thus, it is possible to bring the cutting lubricant as close as possible to cutting edge 8 of the tool mounted on tool holder 1, so that this lubricant introduced under high pressure can be projected with precision onto said cutting edge, as in the conventional case of rotational rates currently, the jet being particularly short.

Thanks to the invention, it is possible to execute a boring tool, in particular for executing large diameters in large monolithic workpieces, which allows perfect and reliable positioning of the tool, as well as very precise adjustment of imbalance.

In addition, holding and positioning of tool holder 1 on flange 2 can be immediately obtained during placement of the tool holder before adjusting it, so that immediate security against a false, accidental maneuver is ensured. Furthermore, the final clamping is improved and additional security is ensured by the implementation of a vertical conduit 113 of the device for limiting the travel of tool holder 1.

Of course, the invention is not limited to the embodiment described and depicted in the appended drawings. Modifications are still possible, notably from the point of view of the make-up of various elements or by substitution of equivalent techniques, without departing in any way from the protected domain of the invention.

The invention claimed is:

1. A boring tool on a flange, comprising:
    at least one tool holder; and
    at least one fastening flange fitted on a machine broach, with a slide for guiding and holding the at least one tool holder perpendicular to the axis of the machine broach by an intermediary of a guiding and clamping assembly with at least one positioning lug of the at least one tool holder or of a counterweight, the at least one fastening flange including a centralized lubrication pathway to channel lubrication to cutting edge(s) of tool holder(s) mounted on the at least one fastening flange,
    wherein the at least one tool holder is fitted on the machine broach through a flange by a gripping surface designed to engage the guiding and clamping assembly of the slide for guiding and holding the tool holder onto the at least one fastening flange, and
    wherein the at least one fastening flange is provided with a device for limiting travel of the at least one tool holder or of the counterweight, in that the positioning lug of the tool holder or of the counterweight operating with a spring is disposed to be displaced upon action of an inclined surface of an adjustment device for the at least one tool holder or of the counterweight during its placement and returns automatically into position after the placement and each tool holder is fitted with a device for lubricating the cutting edge of the boring tool, coupled to the of centralized lubrication pathway for the at least one fastening flange.

2. The boring tool according to claim 1, wherein the gripping surface of the at least one tool holder includes corrugations or similar projections relative to a general form of a guide portion provided on the at least one tool holder.

3. The boring tool according to claim 2, wherein constituent material of the guide portion of the at least one tool holder and the corrugations forming gripping surface is a material exhibiting a hardness greater than that of constituent material of fixed and movable gauges forming the guiding and clamping assembly of the slide.

4. The boring tool according to claim 3, wherein the device limiting the travel of the at least one tool holder or of the counterweight includes, on the one hand, of a side groove provided on a side shoulder of the at least one tool holder leaning against an edge of the at least one fastening flange demarcating the slide and, on the other hand, of a washer or a small flange fastened in a slot on a corresponding side of the at least one fastening flange and exhibiting a part projecting relative to a corresponding support edge of the at least one tool holder, the projecting part engaging the side groove.

5. The boring tool according to claim 4, wherein the washer or the small flange is fastened onto the at least one fastening flange by an intermediary of a stagger screw.

6. The boring tool according to claim 5, wherein the washer or the small flange is mounted on the stagger screw exhibiting two threads, reverse or variable-pitch, and is kept from rotating by an intermediary of a cotter pin.

7. The boring tool according to claim 6, wherein the stagger screw acts on the movable gauge by means of its end.

8. The boring tool according to claim 6, wherein the washer is mounted on the reverse threads or the variable-pitch threads of the stagger screw with provision of an initial offset between a base of the corresponding slot of the at least one fastening flange and a corresponding wall of the washer or of the small flange, in such a way that the stagger screw is screwed into the at least one fastening flange while holding the washer or the small flange by the cotter pin to keep it from rotating.

9. The boring tool according to claim 1, wherein the positioning lug of the at least one tool holder or of the counterweight is mounted on a base of the slide of the at least one fastening flange with a possibility of displacement against an action of a backing spring acting on a displacement cam of the positioning lug.

10. The boring tool according to claim 1, wherein the lubricating device for the cutting edge of the boring tool, coupled to the centralized lubrication pathway for the at least one fastening flange includes a connection device coupled to a perpendicular conduit of the centralized lubrication pathway for the at least one fastening flange and to a longitudinal conduit provided in the body of the at least one tool holder and extended vertically, on an opposite side of the connection device by a vertical conduit emerging into a coolant duct for the cutting edge.

11. The boring tool according to claim 10, wherein the connection device includes a first conduit communicating with or inserted into the perpendicular conduit of the centralized lubrication pathway with interposition of an O-ring or similar, the first conduit emerging into a body extended by a second conduit penetrating into a longitudinal conduit provided in the body of the at least one tool holder.

12. The boring tool according to claim 10, wherein the coolant duct for the cutting edge is a flat-jet nozzle.

13. The boring tool according to claim 12, wherein the flat-jet nozzle is executed in the form of an Allen screw provided for a slit with a lengthened end, the Allen screw being stuck after position adjustment in a corresponding slot provided at an end of the vertical conduit of the at least one tool holder.

\* \* \* \* \*